United States Patent
Benson

[11] 3,714,731
[45] Feb. 6, 1973

[54] FISHING DEVICE

[76] Inventor: Richard J. Benson, P.O. Box 256, Rockaway, N.J. 07866

[22] Filed: Nov. 23, 1970

[21] Appl. No.: 91,852

[52] U.S. Cl. ............... 43/43.11, 43/44.88, 43/44.95
[51] Int. Cl. ............................................. A01k 93/00
[58] Field of Search ............... 43/43.11, 44.88, 44.95

[56] References Cited

UNITED STATES PATENTS

| 3,400,482 | 9/1968 | Ekstrand | 43/43.11 |
| 3,168,790 | 2/1965 | Creasey | 43/43.11 |
| 418,995 | 1/1890 | Tufts | 43/44.95 |
| 2,895,255 | 7/1959 | Irwin | 43/44.88 |
| 2,481,346 | 9/1949 | Rigby | 43/44.95 X |

Primary Examiner—Russell R. Kinsey
Assistant Examiner—Daniel J. Leach
Attorney—Lane, Aitken, Dunner & Ziems

[57] ABSTRACT

A fishing bobber wherein an elongated buoy portion is shaped to float in the water in a position wherein its longitudinal axis is parallel to the water surface. A circular rim portion extends around the buoy portion in a plane perpendicular to the longitudinal axis and is adapted to receive fishing line wound therearound so that, when cast into the water, the bobber will rotate to permit the line to unwind into a fishing position. The rim portion includes a spring loaded clamp in order to retain the line relative to the bobber, yet permit its release upon a predetermined line tension.

19 Claims, 11 Drawing Figures

PATENTED FEB 6 1973 3,714,731

INVENTOR
RICHARD J. BENSON

BY Lane, Aitken, Dunner & Ziems
ATTORNEYS

INVENTOR
RICHARD J. BENSON

PATENTED FEB 6 1973

INVENTOR
RICHARD J. BENSON

BY Lane Aitken, Dunner & Ziems
ATTORNEYS 3,714,731

FISHING DEVICE

BACKGROUND OF THE INVENTION

This invention relates to a fishing bobber and, more particularly, to such a bobber adapted for use with a conventional fishing pole and line for providing several advantages in fishing.

Some of the more sophisticated fishing bobbers in existence today are capable of securing the fishing line at a predetermined point during fishing, while permitting release of the line upon its tensioning in response to a strike. These designs usually permit the bobber to slide over the line to the vicinity of the lure or bait after release so that the bobber may be removed from the line along with the fish. However, the line retention portion of the bobber is often unreliable, and just as important, can severely damage the line to a point where continued use of the line will result in its ultimate breakage.

Other types of sophisticated bobbers now in use are designed to reduce the length of line between the bobber and the hook during casting to minimize whiplash. This is often achieved by providing some means for receiving the line, so that the line can be wound around the bobber before casting, yet will pay out to a predetermined depth upon the bobber hitting the water. However, the known designs are so unreliable that during the unwinding of the line from the bobber, the line often fouls or tangles causing far from desirable results.

SUMMARY OF THE INVENTION

It is therefore an object of the present invention to provide an improved fishing bobber which is adapted to retain the line during fishing, yet will release the line in response to a strike in order to enable the fisherman to retrieve the bobber along with the fish.

It is a further object of the present invention to provide a bobber of the above type in which the line from the bobber to the lure or bait can be wound on the bobber during casting, yet will unwind therefrom upon release into the water in a reliable manner with little danger of fouling or tangling.

Toward the fulfillment of these objects, the fishing bobber of the present invention comprises an elongated buoy portion shaped to float in water in a position wherein its longitudinal axis is parallel to the water surface, a circular rim portion extending around the outer surface of said buoy portion and in a plane perpendicular to said longitudinal axis, said rim portion being symmetrically disposed with respect to said longitudinal axis. The rim is adapted to receive the line in a manner to permit its release in response to a strike, and the line between the hook and the bobber can be stored on the rim during casting.

DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
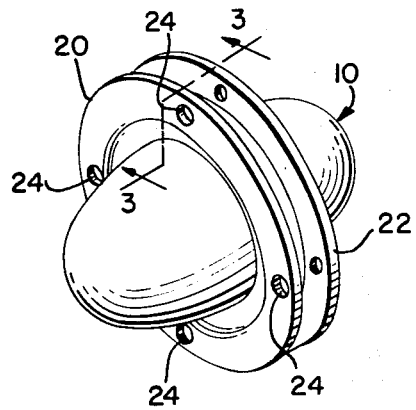
FIG. 1 is a perspective view of the fishing bobber of the present invention.
Figure 2:
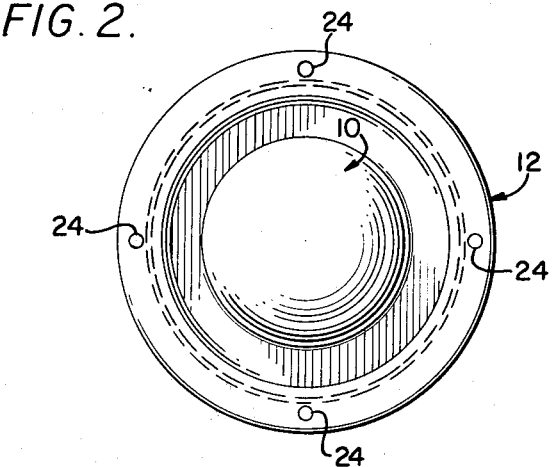
FIG. 2 is an end elevational view of the fishing bobber of FIG. 1.

The fishing bobber of the present invention is shown in FIGS. 1 and 2 of the drawings and comprises, in general, an elongated buoy portion 10 having a circular cross-sectional shape, and a spool portion 12 extending around a portion of the outer surface of the buoy portion.

Figure 3:
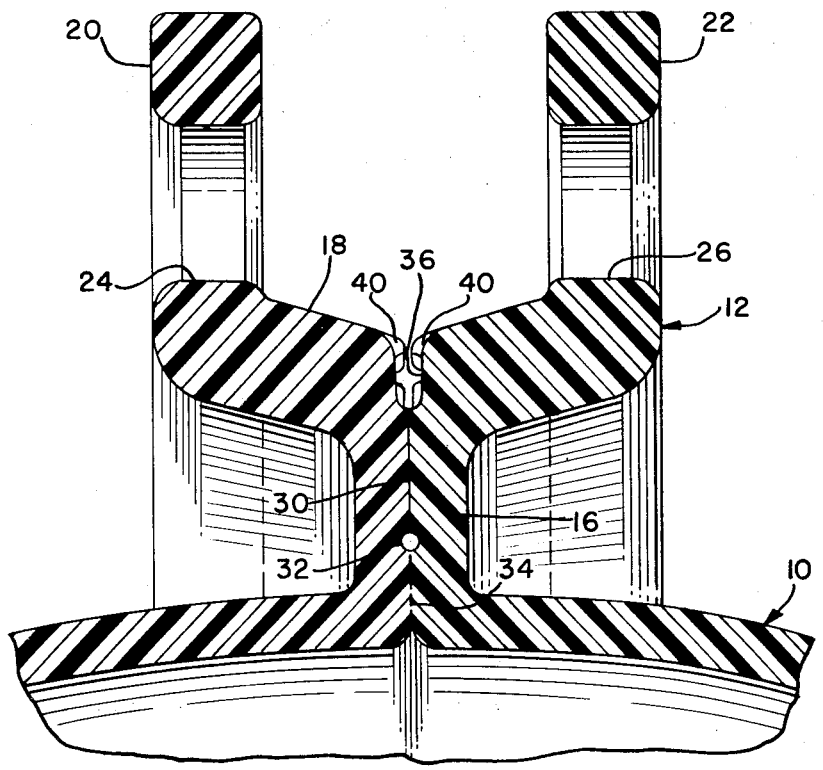
FIG. 3 is an enlarged sectional view taken along the line 3—3 of FIG. 1.

As shown in FIG. 3, the spool portion 12 comprises a circular flange 16 projecting outwardly from the body of the buoy portion 10 and extending around the circumference thereof. An extended portion of the flange 16 is bifurcated with its base portion defining a spool face 18. The bifurcated portion terminates in two flanged portions 20 and 22, having eyelets 24 and 26 respectively formed therethrough. As shown in FIG. 1, four eyelets are formed through each flanged portion 20 and 22 and are spaced at 90° intervals.

A portion of the flange 16 is split to form a cleft portion 30 which extends from the spool face 28 to a through opening 32 formed through the flange. The bobber is formed by two half portions, preferably of a plastic material, which are molded together in any conventional manner along a joint 34 extending from the opening 32 to the hollow inner portion of the buoy portion 10.

Figure 5:
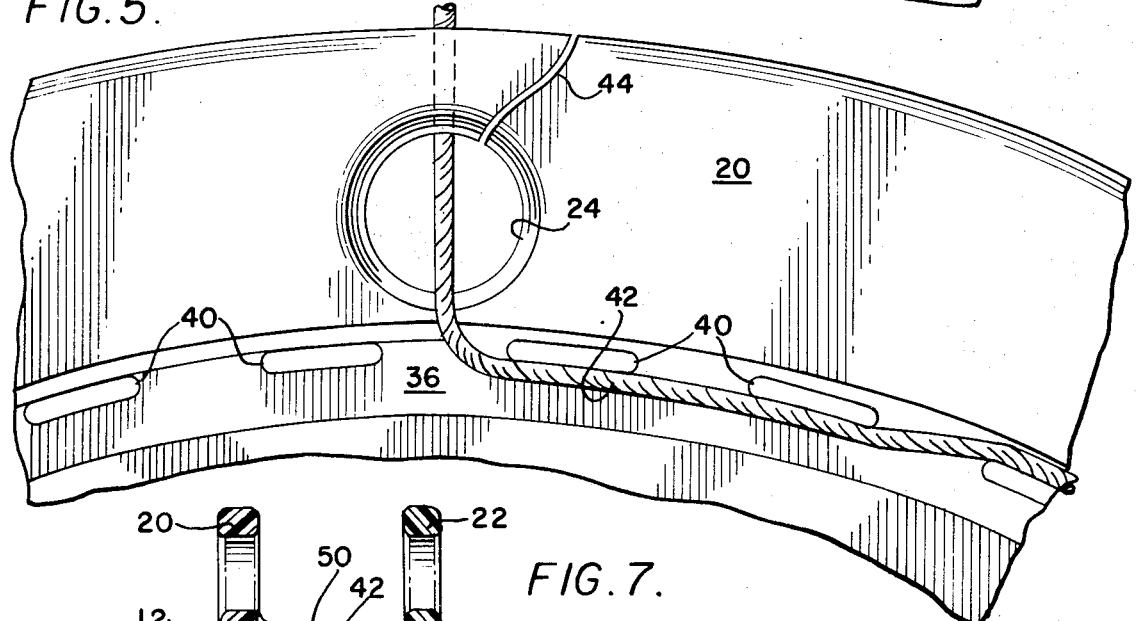
FIG. 5 is a sectional view taken along the line 5—5 of FIG. 4.

A groove 36 is formed in the outer radial portion of the flange 16, and, as better shown in FIG. 5, a plurality of spaced projections 40 are formed on each wall of the groove for its entire annular length.

Figure 4:
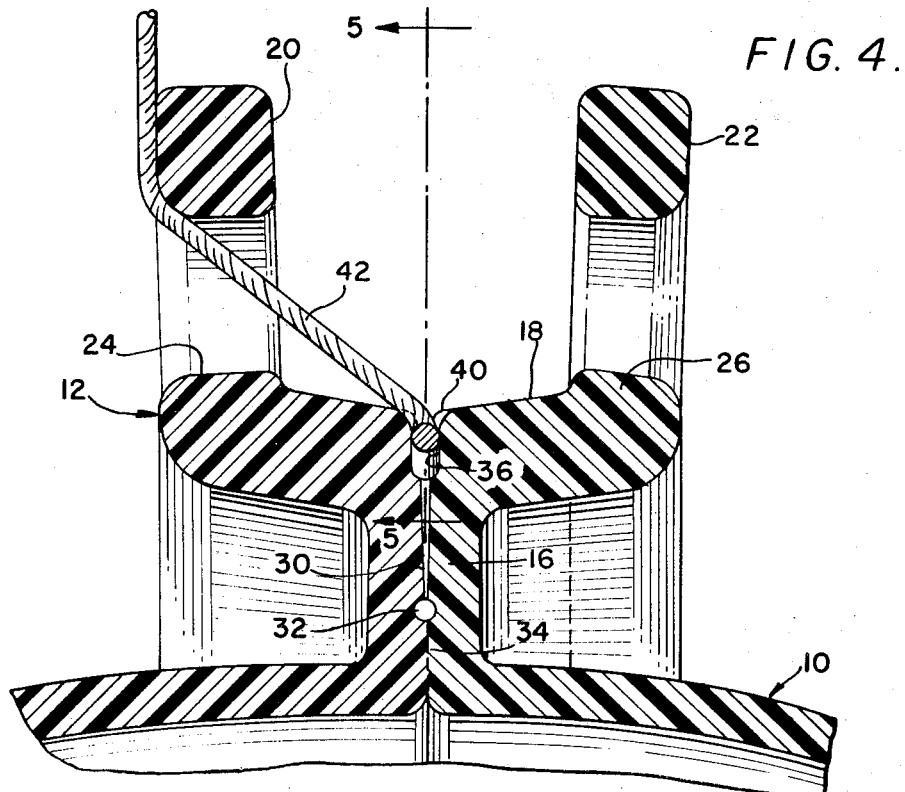
FIG. 4 is a view similar to FIG. 3, but showing the fishing bobber with a line connected thereto.

FIGS. 4 and 5 depict the bobber with a fishing line 42 quick-releasably secured therein. The line 42 is inserted in the groove 36 by simply forcing a portion of the line downwardly, as viewed in FIG. 4, between two facing projections 40. This action cams the projections 40 outwardly and permits a portion of the line 42 to be positioned within the groove 36, with the return spring action of the two portions of the flange 16 to either side of the cleft portion 30 acting upon the line 42 in equal opposition. Thus, the opposite walls of the groove 36 clamp the line 42 by acting on diametrically opposite portions thereof, while the projections 40 prevent escape of the line in a vertical direction as viewed in FIG. 4. The spacing of the projections 40 enables the line to be inserted in this manner in any angular position and under one or more sets of projections.

The line 42 can be inserted through one of the eyelets, such as the eyelet 24 shown in FIG. 5, by forcing the line through a split portion 44 in the flange 20.

The operation of the fishing bobber of the present invention is described in connection with FIG. 6, in which six different modes of line retention are shown schematically in FIGS. 6A through 6E, each mode corresponding to a particular fishing situation.

Figure 6A:
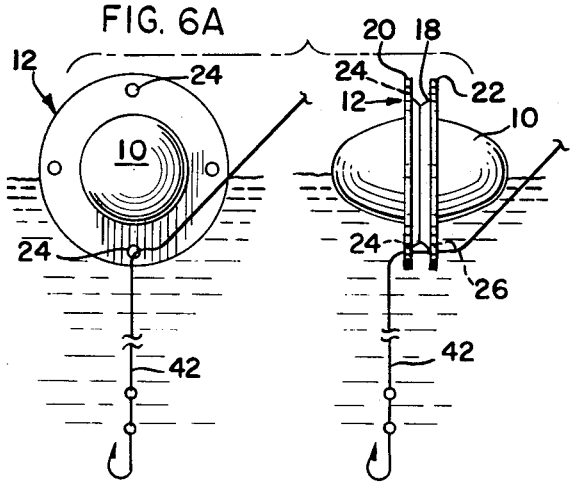
FIGS. 6A–6E are schematic views depicting various modes of operation of the fishing bobber of the present invention.

In FIG. 6A, the line 42 is simply inserted through two opposing eyelets 24 and 26 in the flanges 20 and 22, respectively. When the bobber alights in the water, it will seek a position shown in the drawings, i.e. with its longitudinal axis extending parallel to the water surface, and the line 42 will pay through the eyelets 24 and 26 under the weight of the lure or bait until the lure or bait rests on the bottom of the body of water.

Figure 6B:
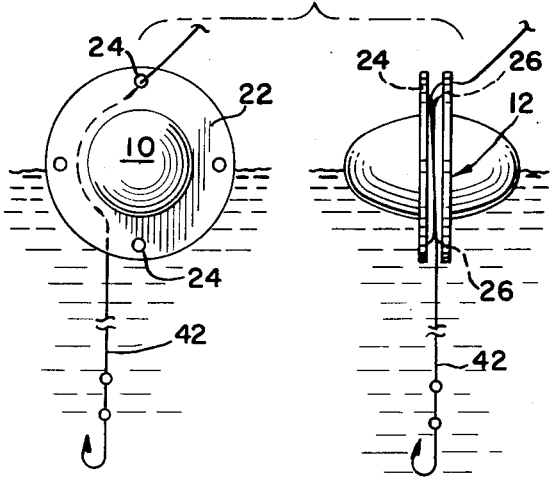

In FIG. 6B, the line 42 is inserted through one eyelet 26, wrapped around the spool face 18 for approximately 135°, and secured in the groove 36 underneath one or more sets of projections 40. The portion of the line 42 extending from the bobber to the hook may then be wound around the spool face 18 prior to casting to eliminate any whiplash during the casting operation. When the bobber alights in the water, and takes the position shown, the weight of the lure or bait acting on the bobber will cause the bobber to rotate in the relatively frictionless bearing provided by the water, and the line 42 smoothly and effortlessly pays out downwardly until the portion retained by the walls of the groove 36 and the projections 40 is reached. This arrests the unwinding action, and the lure or bait will be at the pre-set depth. Upon the line 42 tensioning in response to a strike, the line will release from the groove 36 under the force on the tension, and, by virtue of the line extending through the eyelet 26, the bobber will slide along the line to the vicinity of the fish and thus can be retrieved along with the fish.

Figure 6C:
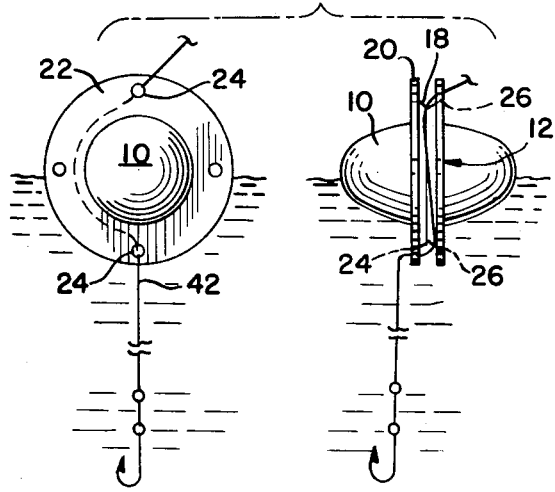

In FIG. 6C, the line 42 is inserted through an eyelet 26 and into the groove 36 immediately adjacent the latter eyelet. The line 42 extends in the groove 36 for approximately 90° to 180° and is then inserted through an eyelet 24. In this mode, however, the bobber will not release the line in response to tensioning of same due to a strike or the like as discussed above.

Figure 6D:
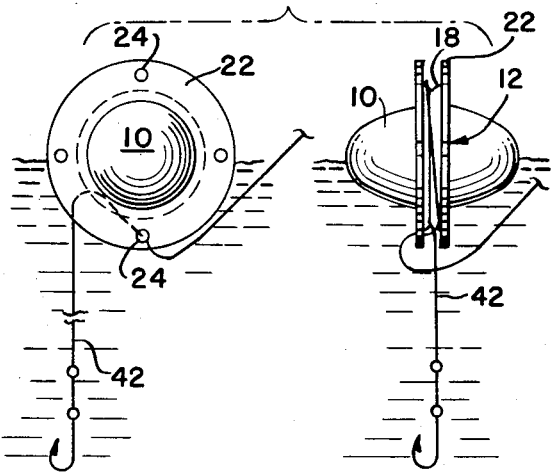

In FIG. 6D, the line 42 is inserted through one eyelet 24, wrapped around the spool face for approximately 360°, and is inserted in the groove 36, whereby it extends for an angular distance of approximately 45°. As in mode C, the bobber will retain this portion of the line 42 despite the tensioning of the line in response to a strike.

Figure 6E:
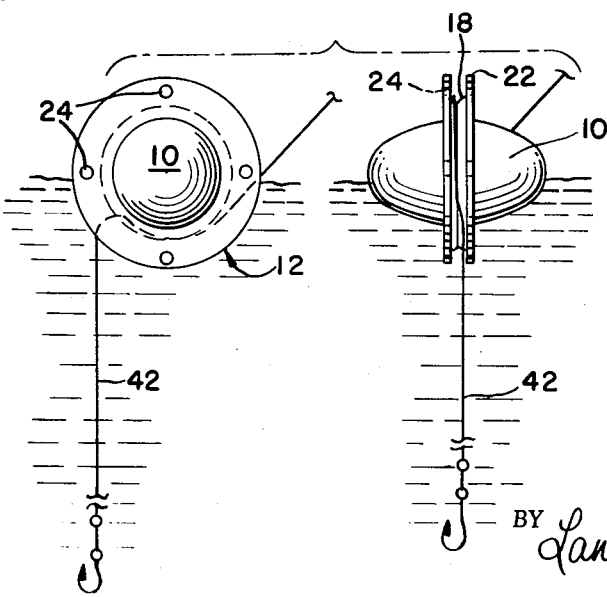

In FIG. 6E, the line 42 simply extends in the groove 36 for approximately 360° so that the line 42 feeds into the groove and out therefrom in generally the same position. This mode is thus similar in result to the two previous modes but does not utilize the eyelets 24 or 26.

It is understood that in each of the modes C, D, and E the portion of the line 42 between the bobber and the lure or bait can be wrapped around the spool face 18 whereby it will unwind therefrom upon the bobber alighting in water as discussed in connection with mode B above.

It can be appreciated from the exemplary modes that numerous other modes are possible utilizing the bobber of the present invention, depending on the particular fishing operation desired.

Figure 7:
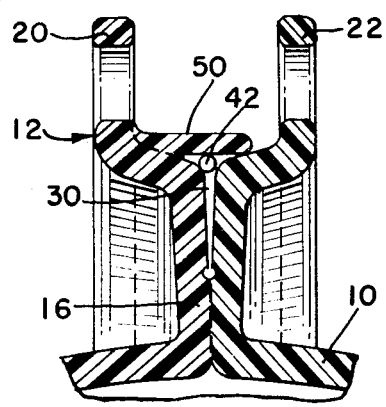
FIG. 7 is a view similar to FIG. 4, but on a reduced scale and showing an alternate embodiment of the present invention.

The embodiment of FIG. 7 is substantially similar to that of the embodiment of FIGS. 1–6, and therefore identical structure is given identical reference numerals. In this embodiment, however, the groove 36 and projections 40 are eliminated and replaced by a plurality of finger-like projections 50 extending from the bottom of the flange 20 and across the cleft portion 30. The line 42 is clamped between the two half portions of the rim 16 at the cleft portion 30 and is retained from upward movement therefrom by the fingers 50. Otherwise, the bobber of the embodiment of FIG. 7 functions identically to the bobber of the previous embodiment.

It is therefore seen that the fishing bobber of the present invention permits a relatively easy line retention at a predetermined point in a manner that does not wear the line, yet retains the line in the absence of a predetermined tension. The fishing bobber of the present invention also permits the line extending between the line or bait and the bobber to be easily unwound from the bobber after the latter hits the water, in a manner to eliminate fouling of the line and yet assure the fisherman of a predetermined fishing depth.

It is also apparent from the foregoing, and from FIGS. 6A–6D of the drawings that the bobber of the present invention enjoys considerable stability in the water since the hub 18 and the rims 20 and 22 are in a plane including the center of buoyancy of the device and are symmetrically balanced with respect to the longitudinal axis and the center of buoyancy of the device; since the center of gravity of the device is at the center of the buoy portion 10, the hub 18 and the rims 20 and 22; and since the metacenter of the device is above its center of gravity when the device is floating in water. Also, with the line wrapped around the spool face 18 and extending through one of the eyelets 24 or 26, the spool portion 12 functions as a diving plane in the water when the line is pulled at a predetermined speed. As a result, the bobber moves under the water with a to and fro undulating action without appreciably twisting the line.

Of course, other variations of the specific construction and arrangement of the fishing bobber disclosed above can be made by those skilled in the art without departing from the invention as defined in the appended claims.

I claim:

1. A fishing bobber comprising an elongated buoy portion shaped to float in water in a position wherein its longitudinal axis is parallel to the water surface, a rim portion shaped to receive line wound therearound and extending around the outer surface of said buoy portion in a plane perpendicular to said longitudinal axis, said rim portion being symmetrically disposed with respect to said longitudinal axis and being formed by two half portions defining a continuous groove, and a plurality of spaced projections formed on opposite walls of said groove for exerting a spring force on said line when placed in said groove for normally retaining said line in said groove, said projections adapted to permit release of said line from said groove in response to a predetermined tension on said line, said buoy portion being adapted to rotate in water to permit the line to unwind from said rim portion.

2. The bobber of claim 1 further comprising means for permitting said bobber to slide along said line after said release.

3. A fishing bobber comprising an elongated buoy portion; a pair of continuous flanges extending around said buoy portion and outwardly from the surface thereof, said flanges defining a rim portion having a continuous annular groove for receiving line; and a plurality of spaced projections formed on the opposite walls of said groove for exerting a spring force on said line when placed in said groove for normally retaining said line in said groove, said projections adapted to permit release of said line from said groove in response to a predetermined tension on said line.

4. The bobber of claim 3 wherein said rim portion is adapted to receive said line at any position along the circumference of said rim portion.

5. The bobber of claim 3 wherein said rim portion is adapted to receive line wound therearound, said buoy portion being adapted to rotate in water to permit the line to unwind from said rim portion.

6. The bobber of claim 3 further comprising means for permitting said bobber slide along said line after said release.

7. A fishing device comprising an elongated symmetrically balanced buoy portion shaped to float in water in a position wherein its longitudinal axis is normally generally parallel to the water surface during fishing, and line receiving means extending around the outer central surface of said buoy portion in a plane including the center of buoyancy of said device and perpendicular to said longitudinal axis and said center of buoyancy, the center of gravity of said device being at the center of said buoy portion and said line receiving means, and the metacenter of said device being above said center of gravity when said device is floating in water.

8. The bobber of claim 7 wherein said line receiving means is in the form of a rim portion shaped to receive line wound therearound, said buoy portion being adapted to rotate in water to permit the line to unwind from said rim portion.

9. The bobber of claim 8 further comprising means to releasably secure said line to said rim portion.

10. The bobber of claim 8 wherein said rim portion is split into two half portions and further comprising means normally retaining said line between said two half portions but adapted to permit release of said line from said two half portions in response to a predetermined tension on said line.

11. The bobber of claim 10 wherein said means for retaining said line comprises means for exerting a spring force on said half portions in a direction towards each other.

12. The bobber of claim 10 further comprising means for permitting said bobber to slide over said line after said release.

13. The device of claim 7 wherein said line receiving means is in the form of a rim portion shaped to receive line wound therearound, said buoy portion and said rim portion being so adapted that a fish hook, or other small weight, on the line will effect constant rate and stable floatation bobber rotation in permitting said line to smoothly unwind from said rim portion.

14. The device of claim 13 further comprising at least two symmetrically balanced apertures formed through said rim portion to receive said line, said line being slidable relative to said rim portion through at least one of said apertures upon the unwinding of said line from said rim portion, said rim portion adapted to function as a diving plane in said water with said line wrapped around said rim portion and extending through at least one of said apertures with the pitch of said device being responsive to the speed of line pull, wherein said device moves under the water surface with a to and fro undulating action without twisting said line.

15. The device of claim 13 wherein said rim portion is split into two half portions and further comprising means normally retaining said line between said two half portions against linear movement, but adapted to permit release of said line from said two half portions in response to a predetermined tension on said line.

16. The device of claim 15 wherein said means for retaining said line between said two half portions comprises means for exerting opposing spring forces on said two half portions in a direction towards each other.

17. The device of claim 16 wherein said half portions define a continuous annular groove and wherein said means for retaining said line further comprises a plurality of symmetrically balanced projections on the opposite walls of said groove for engaging said line with a force proportional to the diameter of said line.

18. The device of claim 15 further comprising means for permitting said device to slide along said line after said release.

19. The device of claim 7 wherein said center of gravity is located at the intersection of said longitudinal axis and said center of buoyancy.

* * * * *